March 1, 1955 H. M. RICHARDSON 2,703,051
MATRIX FOR PRODUCTION OF PLASTIC PRINTING PLATES
Filed Feb. 25, 1949
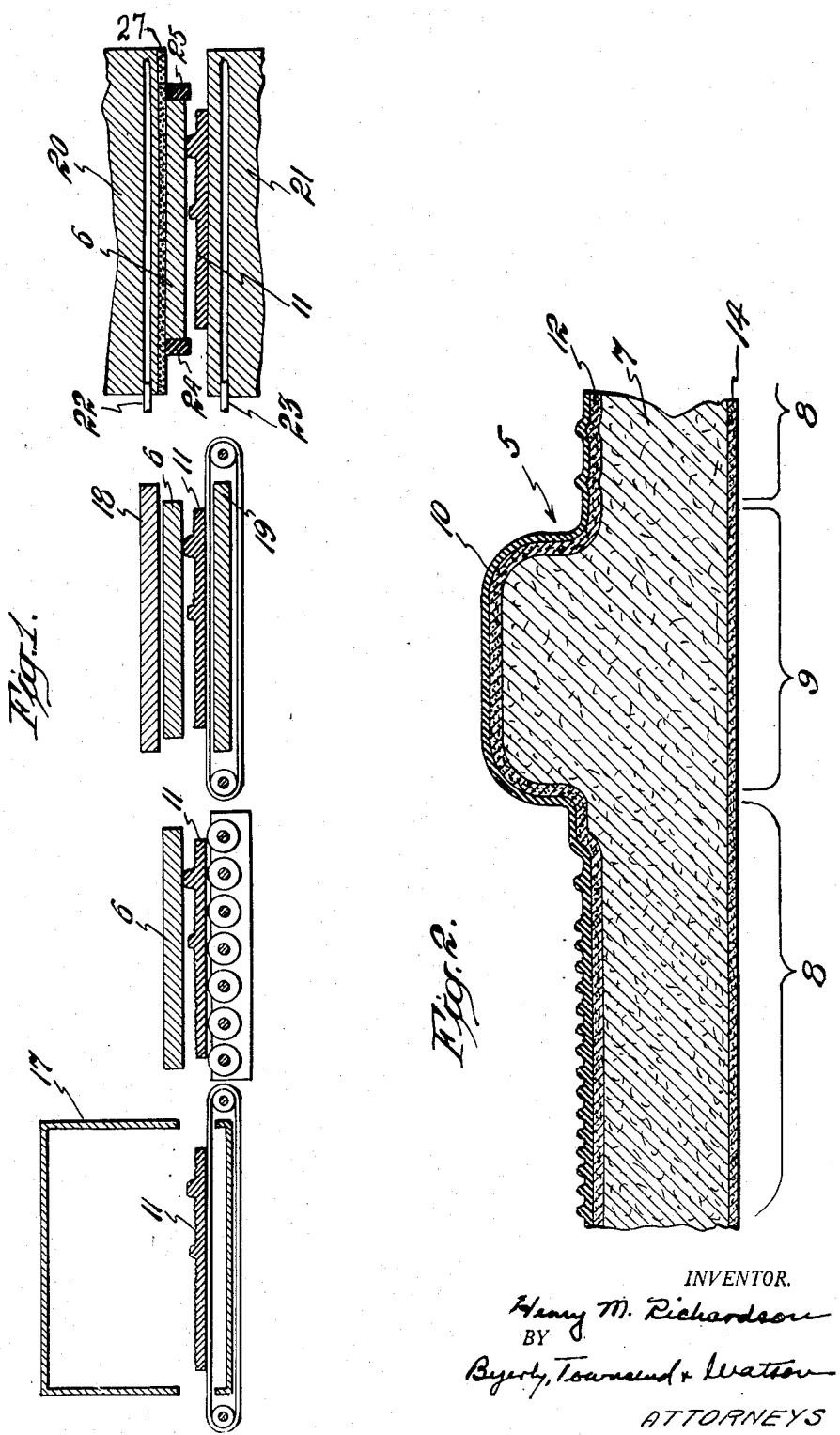
INVENTOR.
Henry M. Richardson
BY
Byerly, Townsend & Watson
ATTORNEYS

United States Patent Office 2,703,051
Patented Mar. 1, 1955

2,703,051

MATRIX FOR PRODUCTION OF PLASTIC PRINTING PLATES

Henry M. Richardson, Springfield, Mass., assignor to News Syndicate Co., Inc., New York, N. Y., a corporation of New York Application February 25, 1949, Serial No. 78,275

23 Claims. (Cl. 101—401.1)

This invention relates to printing and aims to produce an improved matrix for the production of plastic typographic printing plates and an improved method of preparing such a matrix.

A matrix for the production of plastic typographic printing plates consists of a hard rigid sheet whose face bears an intaglio reproduction of the face of a printing form. It must be capable, at elevated temperatures and pressures, of impressing on the face of a sheet of thermoplastic material an exact reproduction of the face of the printing form. It is a particular object of this invention to produce a matrix of this type which can be used in the production of many identical printing plates and which permits the formation of plastic printing plates at the high speeds required for commercial printing, including the production of newspapers.

In the past, matrices for the production of plastic printing plates have been made from blanks about .2 inch thick which consisted of a base sheet of compressible material whose face bears a coating of a smooth film of relatively incompressible plastic material and which could be hardened under the influence of heat. The base sheet of this blank consisted of about 50% by weight of a heat-curing phenolic resin and an equal amount of a filler, usually a combination of paper and asbestos fibres and wood flour. The plastic film consisted of a mixture of a heat-curing phenolic resin and a finely-divided filler, such as wood flour, in the proportions of about 60% resin to 40% filler. A matrix was formed from such a blank by placing the blank on a printing form with the plastic film against the face of the form. This assembly was then placed between the platens of a hydraulic press and subjected to heat and pressure for nine or ten minutes. This resulted in melting the resins in the blank so that they would flow sufficiently to permit the face of the blank to receive an impression corresponding with the face of the printing form, and then hardening those resins. However, those matrices were of very limited utility. They could not be used in connection with the production of printing plates at high speeds and pressures.

In a typographic printing plate, it is necessary that the face of the type and of the engravings project, in large areas, up to as much as about .075 to .090 inch above the base of the plate to provide sufficient clearance between the areas which do not contain any type or engraving and the ink rollers of a printing press. Consequently, a matrix bearing the impression of the face of a printing form contains compressed areas separated from each other by substantially uncompressed areas. Those compressed areas are forced below the uncompressed areas for a substantial distance. The result has been that the surface film on the base sheet was frequently extended beyond its plastic flow limit within uncompressed areas and at points where a compressed area adjoins an uncompressed area, and the face of the base sheet was ruptured at such points. Furthermore, the surface film on such matrices was subject to shearing when the matrix was formed, exposing the base sheet.

When a matrix having a cracked or sheared film is used for the production of plastic printing plates, the plastic of the plate enters the opening or crack in the film and clings to the exposed base sheet of the matrix. This is aggravated as the pressure to which the thermoplastic plate and matrix are subjected is increased. As a printing plate is stripped from such a matrix, the portion of the thermoplastic plate which entered the crack in the matrix film clings to and picks off the exposed portion of the matrix. Even though the crack in the film may be small, only one or at most a very few usable plastic printing plates may be produced from it.

Attempts have been made to overcome these difficulties without success. The matrix film has been coated with a parting material such as powdered graphite which tends to facilitate stripping the printing plate from the matrix. The pressures applied to the matrix and sheet of plastic material during the formation of a printing plate have been limited to very low values. These practices are not only cumbersome and time-consuming, but they also failed to permit the production from a matrix of the number of printing plates which are required for the printing of newspapers or the efficient production of other types of plates requiring a number of duplicates.

I have discovered that the foregoing difficulties may be overcome and a matrix may be prepared whose face consists of a continuous film of heat-cured resin bearing an intaglio reproduction of the face of a printing form by utilizing a laminated blank containing a compressible layer, a flexible cohesive layer coating a face of the compressible layer and a continuous film coating the face of the flexible layer. The compressible layer consists of cellulosic or other fibrous filler intimately mixed with a heat-curing resin. The flexible cohesive layer consists of cellulosic fibres elastically bonded to one another and also impregnated with a single-stage heat-curing resin. The film consists of a single-stage heat-curing resin to which a filler may be added. The matrix can be prepared from such a blank by placing the face of the blank upon the face of a type form. The blank and type form are heated and are then forced against each other at the curing temperature of the resin in the blank until it is cured to at least that point at which it can be removed from the press without losing its shape or damaging its impressed face.

In order that the practice of my invention may be fully understood by those skilled in the art to which it pertains, I will describe the specific embodiment which is illustrated in the accompanying drawings in which:

Fig. 1 is a diagrammatic illustration of the steps performed in the preparation of the matrix which I have invented; and Fig. 2 is a fragmentary transverse section, greatly enlarged, of that matrix.

The matrix 5 is of a laminated structure and is formed from a blank 6 which is illustrated diagrammatically in Fig. 1. It contains a layer 7 having compressed areas 8 and uncompressed area 9, a film 10 which bears an intaglio reproduction of the face of the printing form 11 and a layer 12 which is interposed between and bonded to the layers 7 and 10. The base of the layer 7 is coated with a sheet of porous paper 14.

In the matrix blank 6, the layer 7 is compressible. It is a resinized paper board about .180 inch thick consisting of about equal parts by weight of a heat-curing phenolic resin and fibrous material. The fibrous material is preferably a combination of wood flour and paper fibres. The layer 7 is produced by forming a resinized paper board by a process which involves the suspension of finely-divided particles of phenolic resin molding compound in the beater of a paper machine along with a substantial portion, say 20%, of paper pulp, together with a like amount of solid phenolic resin of the heat-curing type. This combination is thoroughly mixed and suspended in water and the mixture is fed to a paper board-making machine which forms the material as a sheet of comparatively low density. This sheet is taken from the machine and dried until the content of residual moisture or volatile matter is not more than about 4%. Such resinized paper board is now marketed under the names "Premix Board" and "Rogers Board."

The layer 7 may also be made from a stack of impregnated soft paper or pulp. This can be accomplished by conveying uniform sheets of bleached sulphite pulp about .040 inch thick through a bath of a base-condensed phenol formaldehyde resin in water solution. When such a water solution has a solid content of about 20% to 30%, the viscosity is low and penetration of the pulp is sufficiently complete. The impregnated web of sulphite pulp is drawn between squeeze rolls and is then conveyed through a drying oven to evaporate the water and to give the phenolic resin a suitable precure.

The film 10 is about .005 to .010 inch thick and consists of a single-stage heat-curing resin which may have a filler such as Portland cement incorporated therein, and which, during its curing cycle, passes through a stage in which it is partially gelled and has a very high viscosity. The film formed through the use of such a resin may have a glossy surface. When the blank 6 is converted into the matrix 5, such a film is sufficiently plastic to receive a sharp, faithful impression of the face of the printing form but it will not flow excessively within the uncompressed area 9 or at the junction of such areas with the compressed area 8, and, when fully cured, it is hard and rigid.

The resin which I prefer to use for film 10 is an ammonia-catalyzed phenolic resin. Other resins with similar properties which may be used include oil-modified phenol formaldehyde resins, heat-setting copolymers of unsaturated polyesters such as diethylene glycol maleate with ethylenic monomers such as styrene, and heat-curing alkyd resin combined with butylated urea or melamine resin. The filler may constitute about 33% of the total weight of the film 10.

The layer 12 consists of cellulose fibres which are elastically bonded to one another and are subsequently impregnated with a single-stage heat-curing resin. That resin is preferably similar to the resin in film 10. The material for the layer 12 with which I have obtained the best results consists of a sheet of paper whose fibres are bonded to one another by an elastomer of high molecular weight, such as natural or synthetic rubber, and which is impregnated with a resin such as the resin in film 10. Such a sheet can be made by forming a paper web on a paper machine. While this web is still wet, it is passed through a sizing tub containing rubber latex. The term rubber, as used herein, shall be understood to include both natural and synthetic rubbers. The rubber latex diffuses through the web and forms a fairly uniform and fine dispersion of the latex particles in the paper. The paper is then dried. In the drying process the particles of rubber adhere to the individual paper fibres and, if desired, they may be vulcanized to increase their stability. Such a sheet, impregnated with polychloroprene latex, can be purchased under the name "Texon." This sheet is then impregnated with an alcohol solution of the resin. I have found that good results are obtained when the resin content of the sheet is from about 30% to about 40% of its total weight.

Such a layer 12 provides a highly cohesive and flexible coating for the layer 7 and a base for the film 10. When the blank 6 is converted into a matrix 5, the layer 12 follows the contour of the layer 7 without break or rupture even within an uncompressed area 9 or at those points at which compresed areas 8 join an uncompressed area 9. The film 10 is applied to the face of the dried layer 12 as a varnish with which the filler is thoroughly admixed. The film is then thoroughly dried under conditions which insure complete removal of the solvent without the formation of bubbles on the surface of the film. This can be accomplished by allowing the film to air dry for several days. It is then placed in an oven and dried further at elevated temperatures of 130°–150° F. The temperature is then raised to about 200°–250° F. to remove the last traces of solvent and to convert the resin into a state in which it is partially gelled and has the high viscosity required when it is impressed with the face of a printing form for conversion into a matrix. The film 10 is firmly bonded to the layer 12 and follows the contour of the layer 12 to provide a surface on the matrix 5 which is devoid of cracks or ruptures and has a smooth skin which parts easily from a plastic printing plate formed thereon.

The initial impregnation of the fibers of layer 12, through which those fibers are elastically bonded to one another, imparts to that layer a tough and leathery characteristic which permits it to stretch as the blank 6 is molded into a matrix 5 and receive the impression of the type and engravings without rupture, excessive unit stretch or shearing at or near the juncture of a compressed area 8 and an uncompressed area 9. It is not necessary that the high-molecular weight rubber through which the fibres of layer 12 are elastically bonded to one another be vulcanized nor is it essential that a vulcanizable elastomer be used for the bonding agent. Other agents can be used to bond the cellulose fibres of layer 12 to one another elastically such as high molecular weight synthetic materials which are plasticized as required to give an elastomeric or rubbery characteristic. These include: Polyvinyl chloride in the form of a latex or as a thin solution, or copolymers of vinyl chloride and vinyl acetate in solution or emulsion; materials such as polyvinyl butyral, polyvinyl acetate, polyisobutylene, polymers and copolymers comprising acrylic and methacrylic esters, vinyl ethers, styrene; also other high-molecular weight substances such as polyvinyl alcohol, carboxymethyl cellulose, hydroxyethyl cellulose, cellulose acetate, other cellulose esters, ethyl cellulose and other cellulose ethers, linear polyamids and polyesters, and long-chain proteins such as glue and gelatin.

The sheet 14 which coats the base of the layer 7 consists of unimpregnated paper such as 100 lbs. per ream kraft wrapping paper.

The printing form 11 used to convert the blank 6 into a matrix 5 is similar to those which are used for flatbed press printing or for the production of ordinary stereotype matrices. The type and engravings are set up in a chase of conventional construction with the engravings backed up by metal blocks to secure good heat transfer. The printing form 11 is first conveyed through an oven 17 which raises its temperature to about 300° F. The matrix blank 6 is preheated to about 250° F. and is placed on the heated printing form 11 with the film 10 resting upon the face of that form. The printing form 11 and matrix blank 6 are then conveyed between the electrodes 18, 19 of a dielectric heater having a high frequency of the order of 16–40 megacycles. This high frequency heater rapidly raises the temperature of the matrix blank 6 to the molding and curing temperature (about 300°–350° F.). It will, of course, be appreciated that it is not essential that the printing form be passed between the electrodes 18; the matrix blank may be placed on the face of the printing form after that blank has been passed between electrodes 18, 19 and its temperature has been raised to molding and curing temperature.

The heated matrix blank and printing form are immediately placed between the platens 20, 21 of a hydraulic press. The upper platen 20 is maintained at a temperature of about 350° F. by steam circulated through pipe 22. The lower platen 21 is maintained at a temperature of about 300° F. by steam circulated through the pipe 23. The platens 20, 21 are then closed until the blocks 24, 25 are forced against the upper surface of the platen 21 when the face of the printing form is suitably imbedded in the matrix blank and they are held in this closed position for a period of three to four minutes during which the resin is heat-cured. At the end of the pressing period the press is opened and the form 11 and the matrix 5, bearing an exact intaglio reproduction of the face of the form, are removed. The matrix may be further cured if desired by passing it through a heated oven or beneath a bank of infra-red heating lamps. The matrix is then cooled and is ready for the production of plastic printing plates.

In the production of a matrix 5, it is essential that the formation of blisters under the film 10 be avoided. To insure against this, the volatile content of the blank 6 is limited to about 4% and the upper platen 20 of the hydraulic press is equipped with a porous plate or screen 27. This permits volatile matter to escape through the porous layer 14 of the matrix blank 6. The unimpregnated layer 14 also guards against the squeezing of resinous material from the blank 6 into the pores of the plate or screen 27.

A matrix produced in accordance with my invention makes possible the rapid production of a great number of plastic printing plates in a high speed hydraulic press. When such printing plates are prepared with my matrix, pressures of 3,000 pounds or more per square inch can be employed without damaging the matrix and the matrix and molded printing plate may be removed from the press at the end of a pressing period which may be as brief as 10–15 seconds.

The terms which are used herein are terms of description and not of limitation. It is to be understood that the specific embodiment of my invention which I have described may be modified without departing from the spirit of my invention as it is defined in the appended claims.

What I claim is:

1. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another and impregnated with a single-stage heat-curing resin; and a continuous film of a single-stage heat-curing resin coating the face of said flexible layer.

2. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by an elastomer of high molecular weight and impregnated with a single-stage heat-curing resin; and a continuous film of a single-stage heat-curing resin coating the face of said flexible layer.

3. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by rubber latex and impregnated with a single-stage heat-curing resin; and a continuous film of a single-stage heat-curing resin coating the face of said flexible layer.

4. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by a material of high molecular weight and impregnated with a single-stage heat-curing resin coating the face of said flexible layer.

5. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another and impregnated with an ammonia-catalyzed phenolic resin; and a continuous film of a single-stage heat-curing resin coating the face of said flexible layer.

6. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another and impregnated with a single-stage heat-curing resin; a continuous film of a single-stage heat-curing resin coating the face of said flexible layer; and a porous sheet of cellulosic material coating the base of said compressible layer.

7. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by an elastomer of high molecular weight and impregnated with an ammonia-catalyzed phenolic resin; and a continuous film coating the face of said flexible layer and comprising a heat-curing resin which passes through a partially gelled highly viscous state as it is cured.

8. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by a material of high molecular weight and impregnated with a single-stage heat-curing resin; and a continuous film coating the face of said flexible layer and comprising a heat-curing resin which passes through a partially gelled highly viscous state as it is cured.

9. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by an elastomer of high molecular weight and impregnated with a single-stage heat-curing resin; and a continuous film coating the face of said flexible layer and comprising a heat-curing resin which passes through a partially gelled highly viscous state as it is cured.

10. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another with an elastomer of high molecular weight and impregnated with an ammonia-catalyzed phenolic resin; and a continuous film of an ammonia-catalyzed phenolic resin coating the face of said flexible layer.

11. A laminated blank adapted for molding to form a matrix for the production of plastic typographic printing plates comprising a compressible layer of fibrous material interspersed with a heat-curing resin; a flexible cohesive layer coating one face of the compressible layer and comprising cellulose fibres elastically bonded to one another by rubber latex and impregnated with an ammonia-catalyzed phenolic resin; a continuous film of an ammonia-catalyzed phenolic resin containing a finely-divided filler coating the face of said flexible layer; and a layer of porous cellulosic material coating the base of said compressible layer.

12. A laminated matrix for the production of plastic typographic printing plates comprising a layer, having a flat base and containing separate compressed areas, of fibrous material interspersed with a heat-cured resin; a continuous layer, attached to the face of said first-named layer, of cellulose fibres bonded to one another and impregnated with a heat-cured resin; and a continuous film of heat-cured resin bonded to the face of said second-named layer and bearing an intaglio reproduction of the face of a printing form.

13. A laminated matrix for the production of plastic typographic printing plates comprising a layer, having a flat base and containing separate compressed areas, of fibrous material interspersed with a heat-cured resin; a continuous layer, attached to the face of said first-named layer, of cellulose fibres bonded to one another by an elastomer of high molecular weight and impregnated with a heat-cured resin; and a continuous film of heat-cured resin bonded to the face of said second-named layer and bearing an intaglio reproduction of the face of a printing form.

14. A laminated matrix for the production of plastic typographic printing plates comprising a layer, having a flat base and containing separate compressed areas, of fibrous material interspersed with a heat-cured resin; a continuous layer, attached to the face of said first-named layer, of cellulose fibres bonded to one another by a polymer of high molecular weight and impregnated with a heat-cured resin; and a continuous film of heat-cured resin bonded to the face of said second-named layer and bearing an intaglio reproduction of the face of a printing form.

15. A laminated matrix for the production of plastic typographic printing plates comprising a layer, having a flat base and containing separated compressed areas, of fibrous material interspersed with a heat-cured resin; a continuous layer, attached to the face of said first-named layer, of cellulose fibres bonded to one another and impregnated with a heat-cured resin; a continuous film of heat-cured resin bonded to the face of said second-named layer and bearing an intaglio reproduction of the face of a printing form; and a layer of porous cellulosic material coating the base of said first-named layer.

16. A laminated matrix for the production of plastic typrographic printing plates comprising a layer, having a flat base and containing compressed areas and uncompressed areas extending at least .075 inch above said compressed areas, of fibrous material interspersed with a heat-cured resin; a continuous layer, attached to the face of said first-named layer, of cellulose fibres bonded to one another and impregnated with a heat-cured resin; and a continuous film of heat-cured resin bonded to the face of said second-named layer and bearing an intaglio reproduction of the face of a printing form.

17. A laminated matrix for the production of plastic typographic printing plates comprising a layer, having a flat base and containing separate compressed areas, of fibrous material interspersed with a heat-cured resin; a continuous layer, attached to the face of said first-named layer, of cellulose fibres bonded to one another by an elastomer of high molecular weight and impregnated with a heat-cured ammonia-catalyzed phenolic resin; and a continuous film of a heat-cured ammonia-catalyzed phenolic resin bonded to the face of said second-named layer and bearing an intaglio reproduction of the face of a printing form.

18. A laminated matrix for the production of plastic typographic printing plates comprising a layer, having a flat base and containing separate compressed areas, of fibrous material interspersed with a heat-cured resin; a continuous layer, attached to the face of said first-named layer, of cellulose fibres bonded to one another by rubber latex and impregnated with a heat-cured ammonia-catalyzed phenolic resin; and a continuous film of heat-cured ammonia-catalyzed phenolic resin bonded to the face of said second-named layer and bearing an intaglio reproduction of the face of a printing form.

19. The method of preparing a matrix for the production of plastic typographic printing plates which comprises forming a matrix blank by assembling in superposed relation a compressible layer of fibrous material interspersed with a heat-curing resin, a flexible cohesive layer of cellulose fibres elastically bonded to one another and impregnated with a single-stage heat-curing resin and a continuous film of a single-stage heat-curing resin; subjecting the blank and printing form to heat; and forcing the face of the printing form against the face of said film at the curing temperature of said resin until it is cured to at least the point at which the matrix can be removed from the press without losing its shape or damaging its impressed face.

20. The method of preparing a matrix for the production of plastic typographic printing plates which comprises forming a matrix blank by assembling in superposed relation a compressible layer of fibrous material interspersed with a heat-curing resin, a flexible cohesive layer of cellulose fibres elastically bonded to one another and impregnated with a single-stage heat-curing resin and a continuous film of a single-stage heat-curing resin; heating the printing form; heating the blank to the curing temperature of said resins; and molding the blank into a printing plate by forcing the face of the printing form against the face of said film between heated platens in a press.

21. The method of preparing a matrix for the production of typographic printing plates which comprises heating a printing form and a matrix blank having in superposed relation a compressible layer of fibrous material interspersed with a heat-curing resin, a flexible cohesive layer of cellulose fibres elastically bonded to one another and impregnated with a single-stage heat-curing resin and a continuous film of single-stage heat-curing resin to a temperature below the curing temperature of said resin; placing the face of the printing form against the face of the film on said blank; rapidly heating said blank to the curing temperature of the resins in said blank by passing said blank and printing form between the electrodes of a high frequency dielectric heater; and then subjecting said printing form and blank to pressure between heated platens in a press.

22. The method of preparing a matrix for the production of typographic printing plates which comprises heating a printing form and a matrix blank having in superposed relation a compressible layer of fibrous material interspersed with a heat-curing resin, a flexible cohesive layer of cellulose fibres elastically bonded to one another and impregnated with a single-stage heat-curing resin and a continuous film of single-stage heat-curing resin to a temperature below the curing temperature of said resin; rapidly heating said blank to the curing temperature of the resins in said blank by passing said blank between the electrodes of a high frequency dielectric heater; placing the face of the printing form against the face of the film on said blank; and then subjecting said printing form and blank to pressure between heated platens in a press.

23. The method of preparing a matrix for the production of plastic typographic printing plates which comprises forming a matrix blank by assembling in superposed relation a porous layer of cellulosic material, a compressible layer of fibrous material interspersed with a heat-curing resin, a flexible cohesive layer of cellulose fibres elastically bonded to one another and impregnated with a single-stage heat-curing resin and a continuous film of a single-stage heat-curing resin; heating said blank; heating said printing form to the curing temperature of said resin; and forcing the face of the printing form against the face of said film between the platens in a press having a porous plate attached to one of said platens and in contact with said porous layer.

References Cited in the file of this patent

UNITED STATES PATENTS

| Number | Name | Date |
|---|---|---|
| 1,233,298 | Baekeland | July 17, 1917 |
| 1,398,142 | Novotny | Nov. 22, 1921 |
| 1,401,633 | Novotny | Dec. 27, 1921 |
| 1,726,151 | Hole | Aug. 27, 1929 |
| 1,871,568 | Swan et al. | Aug. 16, 1932 |
| 1,905,749 | Richater | Apr. 25, 1933 |
| 1,999,154 | Huck | Apr. 23, 1935 |
| 2,075,636 | Browne | Mar. 30, 1937 |
| 2,091,253 | Bungay | Aug. 31, 1937 |
| 2,099,154 | Waters | Nov. 16, 1937 |
| 2,139,054 | Wilson | Dec. 6, 1938 |
| 2,211,601 | Hensley | Aug. 13, 1940 |
| 2,278,291 | Swan et al. | Mar. 31, 1942 |
| 2,509,499 | Higgens | May 30, 1950 |

FOREIGN PATENTS

| Number | Country | Date |
|---|---|---|
| 589,220 | Great Britain | June 13, 1947 |